(12) United States Patent
Nishikawa et al.

(10) Patent No.: US 10,985,628 B2
(45) Date of Patent: Apr. 20, 2021

(54) ELECTRIC DRIVE DEVICE

(71) Applicant: Mitsubishi Electric Corporation, Tokyo (JP)

(72) Inventors: Hideya Nishikawa, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 55 days.

(21) Appl. No.: 16/319,646

(22) PCT Filed: Aug. 4, 2016

(86) PCT No.: PCT/JP2016/072979
§ 371 (c)(1),
(2) Date: Jan. 22, 2019

(87) PCT Pub. No.: WO2018/025378
PCT Pub. Date: Feb. 8, 2018

(65) Prior Publication Data
US 2020/0220423 A1    Jul. 9, 2020

(51) Int. Cl.
*H02K 5/22* (2006.01)
*H02K 11/24* (2016.01)
(Continued)

(52) U.S. Cl.
CPC ............ *H02K 5/225* (2013.01); *H01R 27/02* (2013.01); *H02K 11/24* (2016.01); *H02K 11/33* (2016.01);
(Continued)

(58) Field of Classification Search
CPC ........... H02K 11/33; H02K 11/03; H02K 5/12
(Continued)

(56) References Cited

U.S. PATENT DOCUMENTS

2002/0060105 A1* 5/2002 Tominaga ............ B62D 5/0406
180/443
2004/0020708 A1* 2/2004 Szabela .................. B62D 5/092
180/446
(Continued)

FOREIGN PATENT DOCUMENTS

EP     0753448 A1 *  1/1997  ............. H02K 11/40
EP     0753448 A1    1/1997
(Continued)

OTHER PUBLICATIONS

Communication dated Dec. 24, 2019 from Japanese Patent Office in counterpart JP Application No. 2018-531690.
(Continued)

*Primary Examiner* — Jose A Gonzalez Quinones
(74) *Attorney, Agent, or Firm* — Sughrue Mion, PLLC; Richard C. Turner

(57) ABSTRACT

Provided is an electric drive device capable of achieving redundant supply of power from outside and achieving downsizing. An electric drive device, including: a motor; a controller configured to control driving of the motor; and a power supply connector electrically connected to the controller, the power supply connector including: a power supply connector housing; and a first power supply terminal and a second power supply terminal, which are provided in the power supply connector housing and electrically connected to separate external power sources, respectively.

6 Claims, 10 Drawing Sheets

(51) Int. Cl.
*H02K 11/33* (2016.01)
*H02K 11/40* (2016.01)
*H01R 27/02* (2006.01)
*B62D 5/04* (2006.01)
*B62D 6/08* (2006.01)

(52) U.S. Cl.
CPC ............ *H02K 11/40* (2016.01); *B62D 5/0403* (2013.01); *B62D 5/0463* (2013.01); *B62D 6/08* (2013.01)

(58) Field of Classification Search
USPC ..................................... 310/71, 75 R, 94, 98
See application file for complete search history.

(56) References Cited

U.S. PATENT DOCUMENTS

| | | | |
|---|---|---|---|
| 2009/0023341 A1* | 1/2009 | Craig ................... | H01R 13/648 439/620.21 |
| 2015/0137636 A1 | 5/2015 | Morimoto et al. | |
| 2015/0226627 A1 | 8/2015 | Kuwahara et al. | |
| 2016/0006324 A1 | 1/2016 | Akutsu et al. | |
| 2016/0036371 A1* | 2/2016 | Yamasaki ............. | B62D 5/046 318/400.22 |
| 2016/0174393 A1* | 6/2016 | Asao .................... | H05K 5/0069 180/443 |
| 2017/0217481 A1* | 8/2017 | Asao ....................... | H02P 27/06 |
| 2018/0201300 A1* | 7/2018 | Baranyai ............... | B62D 5/046 |

FOREIGN PATENT DOCUMENTS

| | | |
|---|---|---|
| JP | 2005-317293 A | 11/2005 |
| JP | 2010-196529 A | 9/2010 |
| JP | 2016-032977 A | 3/2016 |
| JP | 2016-068796 A | 5/2016 |
| WO | 2014/054155 A1 | 4/2014 |
| WO | 2014/064856 A1 | 5/2014 |
| WO | 2016/063367 A1 | 4/2016 |

OTHER PUBLICATIONS

International Search Report of PCT/JP2016/072979 dated Oct. 18, 2016.
Communication dated Aug. 14, 2019 from the European Patent Office in application No. 16911637.3.

* cited by examiner

ELECTRIC DRIVE DEVICE

CROSS REFERENCE TO RELATED APPLICATIONS

This application is a National Stage of International Application No. PCT/JP2016/072979 filed Aug. 4, 2016.

TECHNICAL FIELD

The present invention relates to an electric drive device configured to allow driving of a motor.

BACKGROUND ART

Hitherto, there has been known an electric power steering device including a motor, a controller configured to control driving of the motor, and two power supply connectors electrically connected to the controller and electrically connected to separate external power sources, respectively. The electric power steering device achieves redundant supply of power from outside (for example, see Patent Literature 1).

CITATION LIST

Patent Literature

[PTL 1] JP 2016-32977 A

SUMMARY OF INVENTION

Technical Problem

However, the electric power steering device includes two power supply connectors, and hence it is required that a space for arrangement of the two power supply connectors be secured. Accordingly, there has been a problem in that an electric drive device is increased in size.

The present invention provides an electric drive device capable of achieving redundant supply of power from outside, and achieving downsizing.

Solution to Problem

According to one embodiment of the present invention, there is provided an electric drive device, including: a motor; a controller configured to control driving of the motor; and a power supply connector electrically connected to the controller, the power supply connector including: a power supply connector housing; and a first power supply terminal and a second power supply terminal, which are provided in the power supply connector housing and electrically connected to separate external power sources, respectively.

Advantageous Effects of Invention

In the electric drive device according to the one embodiment of the present invention, the power supply connector includes the first power supply terminal and the second power supply terminal provided in the power supply connector housing and electrically connected to separate external power sources, respectively. Thus, redundant supply of power from outside can be achieved, and downsizing of the electric drive device can be achieved.

DESCRIPTION OF EMBODIMENTS

First Embodiment

Figure 1:
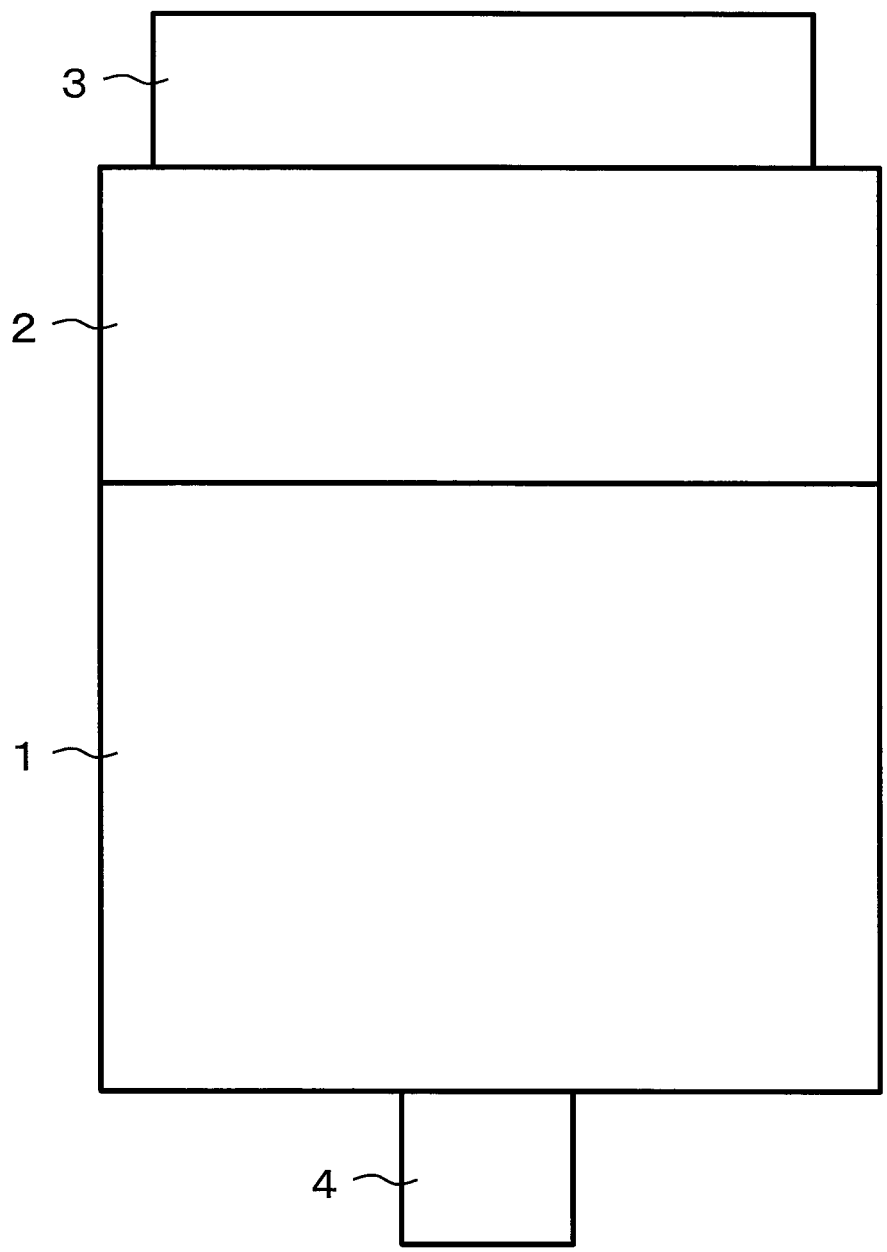
FIG. 1 is a side view for illustrating an electric drive device according to a first embodiment of the present invention.
Figure 2:
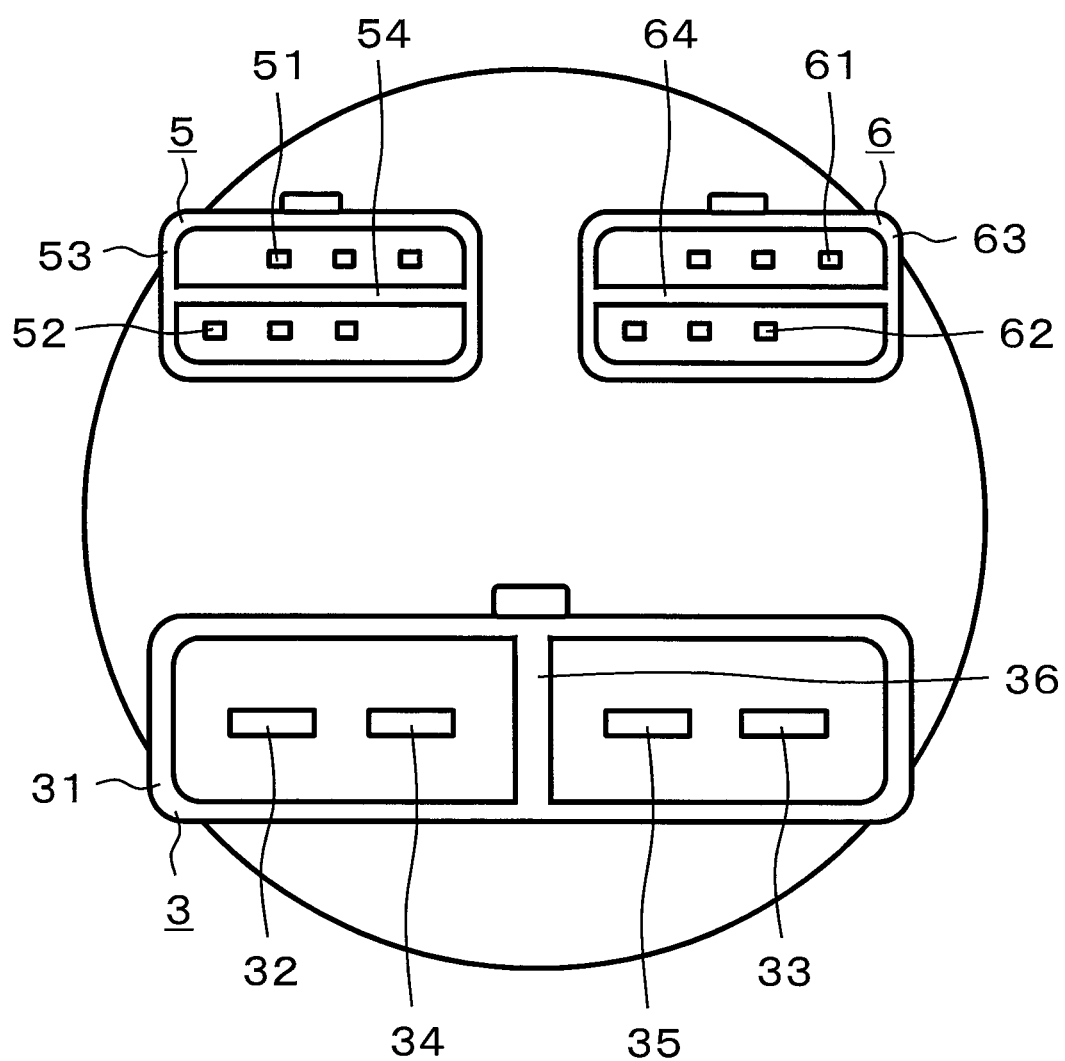
FIG. 2 is a plan view for illustrating the electric drive device of FIG. 1.

FIG. 1 is a side view for illustrating an electric drive device according to a first embodiment of the present invention. FIG. 2 is a plan view for illustrating the electric drive device of FIG. 1. The electric drive device according to the first embodiment of the present invention includes a motor 1, an electronic control unit (ECU) 2, a power supply connector 3, a boss 4, a vehicle signal connector 5, and a torque sensor connector 6. The ECU 2 is a controller provided to the motor 1 and configured to control driving of the motor 1. The power supply connector 3 is provided to the ECU 2 and electrically connected to the ECU 2. The boss 4 is provided to the motor 1. The vehicle signal connector 5 is provided to the ECU 2 and electrically connected to the ECU 2. The torque sensor connector 6 is provided to the ECU 2 and electrically connected to the ECU 2. The ECU 2 is arranged at one axial end portion of the motor 1. The boss 4 is provided at another axial end portion of the motor 1. The power supply connector 3, the vehicle signal connector 5, and the torque sensor connector 6 are arranged so that the ECU 2 is arranged between the motor 1 and each of the power supply connector 3, the vehicle signal connector 5, and the torque sensor connector 6.

In the motor 1, there are arranged a stator and a rotor. The stator includes a first coil and a second coil, which are mounted thereto and respectively form a first electric circuit and a second electric circuit independent of each other. The rotor is supported by two bearings, and includes magnets. The boss 4 is fixed to a distal end portion of the rotor. The boss 4 transmits torque to a gear.

The ECU 2 is configured to control driving of the motor 1. The ECU 2 includes a control circuit, and a first inverter and a second inverter that are independent of each other. The first inverter is electrically connected to the first coil. The second inverter is electrically connected to the second coil.

The power supply connector 3 includes a power supply connector housing 31, a first power supply terminal 32, a second power supply terminal 33, a first ground terminal 34, and a second ground terminal 35. The first power supply terminal 32 and the second power supply terminal 33 are provided in the power supply connector housing 31, and electrically connected to separate external power sources, respectively. The first ground terminal 34 and the second ground terminal 35 are provided in the power supply connector housing 31, and electrically connected to an external ground. Moreover, the power supply connector 3 further includes a power supply connector partition wall 36 formed on the power supply connector housing 31 and configured to isolate the first power supply terminal 32 and the first ground terminal 34 from the second power supply terminal 33 and the second ground terminal 35.

The first ground terminal 34 and the second ground terminal 35 are arranged adjacent to each other through intermediation of the power supply connector partition wall 36. In other words, the first power supply terminal 32, the second power supply terminal 33, the first ground terminal 34, and the second ground terminal 35 arrayed in one direction in the order of the first power supply terminal 32, the first ground terminal 34, the second ground terminal 35, and the second power supply terminal 33 when seen in an axis line direction of the motor 1.

The power supply connector partition wall 36 prevents occurrence of a short circuit when a conductive substance such as water permeates into the power supply connector housing 31. Specifically, for example, when the conductive substance permeates into a region of the power supply connector housing 31 in which the first power supply terminal 32 and the first ground terminal 34 are arranged, the conductive substance having permeated is prevented from permeating into a region of the power supply connector housing 31 in which the second power supply terminal 33 and the second ground terminal 35 are arranged. With this, occurrence of a short circuit between the second power supply terminal 33 and the second ground terminal 35 is prevented. Meanwhile, when the conductive substance permeates into the region of the power supply connector housing 31 in which the second power supply terminal 33 and the second ground terminal 35 are arranged, the conductive substance having permeated is prevented from permeating into the region of the power supply connector housing 31 in which the first power supply terminal 32 and the first ground terminal 34 are arranged. With this, occurrence of a short circuit between the first power supply terminal 32 and the first ground terminal 34 is prevented. The power supply connector partition wall 36 may also be provided between the first power supply terminal 32 and the first ground terminal 34. Moreover, the power supply connector partition wall 36 may also be provided between the second power supply terminal 33 and the second ground terminal 35.

A signal emitted from a vehicle-side device being a vehicle signal emitting device is transmitted to the vehicle signal connector 5 via, for example, a controller area network (CAN). The vehicle signal connector 5 includes a first vehicle signal terminal 51 and a second vehicle signal terminal 52 that are electrically connected to separate vehicle-side devices, respectively. In this example, the vehicle signal connector 5 includes three first vehicle signal terminals 51 and three second vehicle signal terminals 52. The three first vehicle signal terminals 51 are arrayed in one direction when seen in the axis line direction of the motor 1. The three second vehicle signal terminals 52 are arrayed in one direction when seen in the axis line direction of the motor 1.

Moreover, the vehicle signal connector 5 further includes a vehicle signal connector housing 53 and a vehicle signal connector partition wall 54. In the vehicle signal connector housing 53, there are provided the first vehicle signal terminals 51 and the second vehicle signal terminals 52. The vehicle signal connector partition wall 54 is formed on the vehicle signal connector housing 53, and is configured to isolate the first vehicle signal terminals 51 and the second vehicle signal terminals 52 from each other.

A signal emitted from a torque sensor is transmitted to the torque sensor connector 6. The torque sensor connector 6 includes a first torque sensor signal terminal 61 and a second torque sensor signal terminal 62 that are electrically connected to separate torque sensors, respectively. In this example, the torque sensor connector 6 includes three first torque sensor signal terminals 61 and three second torque sensor signal terminals 62. The three first torque sensor signal terminals 61 are arrayed in one direction when seen in the axis line direction of the motor 1. The three second torque sensor signal terminals 62 are arrayed in one direction when seen in the axis line direction of the motor 1.

Moreover, the torque sensor connector 6 further includes a torque sensor connector housing 63 and a torque sensor connector partition wall 64. In the torque sensor connector housing 63, the There are provided first torque sensor signal terminals 61 and the second torque sensor signal terminals 62. The torque sensor connector partition wall 64 is formed on the torque sensor connector housing 63, and is configured to isolate the first torque sensor signal terminals 61 and the second torque sensor signal terminals 62 from each other.

As described above, the electric drive device according to the first embodiment of the present invention includes the motor 1, the ECU 2 configured to control driving of the motor 1, and the power supply connector 3 electrically connected to the ECU 2. The power supply connector 3 includes the power supply connector housing 31, and the first power supply terminal 32 and the second power supply terminal 33 that are provided in the power supply connector housing 31 and electrically connected to separate external power sources, respectively. Therefore, redundant supply of power from outside can be achieved, and downsizing of the electric drive device can be achieved. Further, it is only required that one connector be mounted to the power supply connector 3 at the time of assembly, and hence reduction in the number of assembly steps can be achieved.

Further, the power supply connector 3 includes the power supply connector partition wall 36 formed on the power supply connector housing 31 and configured to isolate the first power supply terminal 32 and the second power supply terminal 33 from each other. Thus, when the conductive substance such as water permeates into a region of the power supply connector housing 31 in which any one of the first power supply terminal 32 and the second power supply terminal 33 is arranged, the conductive substance having permeated is prevented from permeating into a region of the power supply connector housing 31 in which another of the first power supply terminal 32 and the second power supply terminal 33 is arranged. With this, occurrence of a short circuit in the another of the first power supply terminal 32 and the second power supply terminal 33 is prevented. As a result, enhancement of reliability of the electric drive device can be achieved.

Further, the power supply connector 3 includes the first ground terminal 34 and the second ground terminal 35 that are provided in the power supply connector housing 31 and electrically connected to the external ground, and the first ground terminal 34 and the second ground terminal 35 are arranged adjacent to each other. Thus, electrical connection of a portion in the ECU 2 with each of the first ground terminal 34 and the second ground terminal 35 can be established in a short distance. With this, reduction in impedance in the electric drive device can be achieved, reduction in cost of the electric drive device can be achieved owing to reduction in copper amount, and downsizing of the electric drive device can be achieved owing to space saving.

Further, the electric drive device includes the vehicle signal connector 5 electrically connected to the ECU 2, and the torque sensor connector 6 electrically connected to the ECU 2. The vehicle signal connector 5 includes the first vehicle signal terminals 51 and the second vehicle signal terminals 52 electrically connected to separate vehicle-side devices, respectively. The torque sensor connector 6 includes the first torque sensor signal terminals 61 and the second torque sensor signal terminals 62 electrically connected to separate torque sensors, respectively. Therefore, redundancy of a vehicle signal and a torque sensor signal can be achieved. As a result, reliability of the electric drive device can be enhanced.

Further, the vehicle signal connector 5 includes the vehicle signal connector housing 53 in which the first vehicle signal terminals 51 and the second vehicle signal terminals 52 are provided. The torque sensor connector 6 includes the torque sensor connector housing 63 in which the first torque sensor signal terminals 61 and the second torque sensor signal terminals 62 are provided. Therefore, redundancy of the vehicle signal and the torque sensor signal can be achieved, and downsizing of the electric drive device can be achieved. Further, it is only required that one connector be mounted to the vehicle signal connector 5 and one connector be mounted to the torque sensor connector 6 at the time of assembly, and hence reduction in the number of assembly steps can be achieved.

Further, the vehicle signal connector 5 includes the vehicle signal connector partition wall 54 formed on the vehicle signal connector housing 53 and configured to isolate the first vehicle signal terminals 51 and the second vehicle signal terminals 52 from each other. The torque sensor connector 6 includes the torque sensor connector partition wall 64 formed on the torque sensor connector housing 63 and configured to isolate the first torque sensor signal terminals 61 and the second torque sensor signal terminals 62 from each other. Therefore, when the conductive substance such as water permeates into a region of the vehicle signal connector housing 53 in which any one of the first vehicle signal terminals 51 and the second vehicle signal terminals 52 are arranged, the conductive substance having permeated is prevented from permeating into a region of the vehicle signal connector housing 53 in which another of the first vehicle signal terminals 51 and the second vehicle signal terminals 52 are arranged. Further, when the conductive substance permeates into a region of the torque sensor connector housing 63 in which any one of the first torque sensor signal terminals 61 and the second torque sensor signal terminals 62 are arranged, the conductive substance having permeated is prevented from permeating into a region of the torque sensor connector housing 63 in which another of the first torque sensor signal terminals 61 and the second torque sensor signal terminals 62 are arranged. With this, occurrence of a short circuit in the another of the first vehicle signal terminals 51 and the second vehicle signal terminals 52 is prevented, and occurrence of a short circuit in the another of the first torque sensor signal terminals 61 and the second torque sensor signal terminals 62 is prevented. As a result, driving of the electric drive device can be performed, and reliability of the electric drive device can be enhanced.

Second Embodiment

Figure 3:
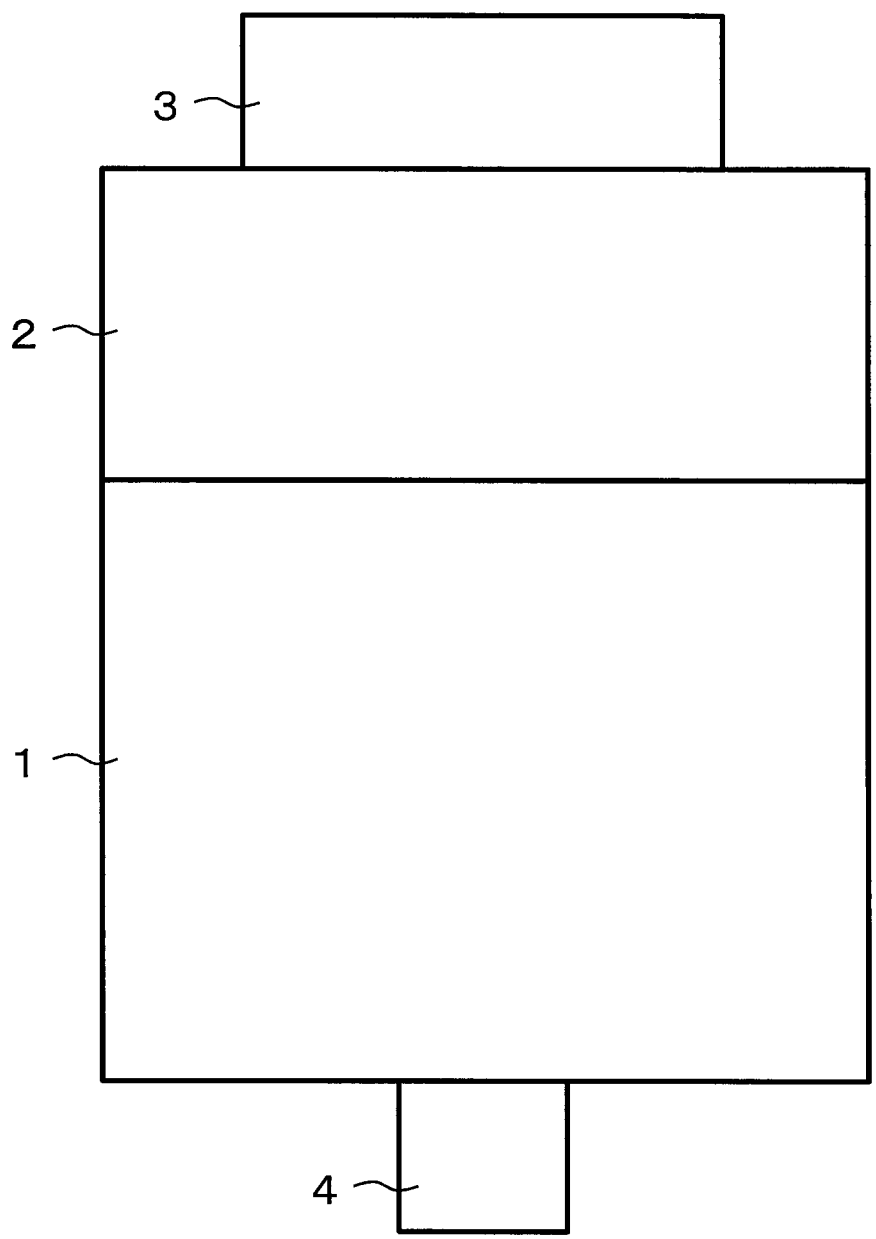
FIG. 3 is a side view for illustrating an electric drive device according to a second embodiment of the present invention.
Figure 4:
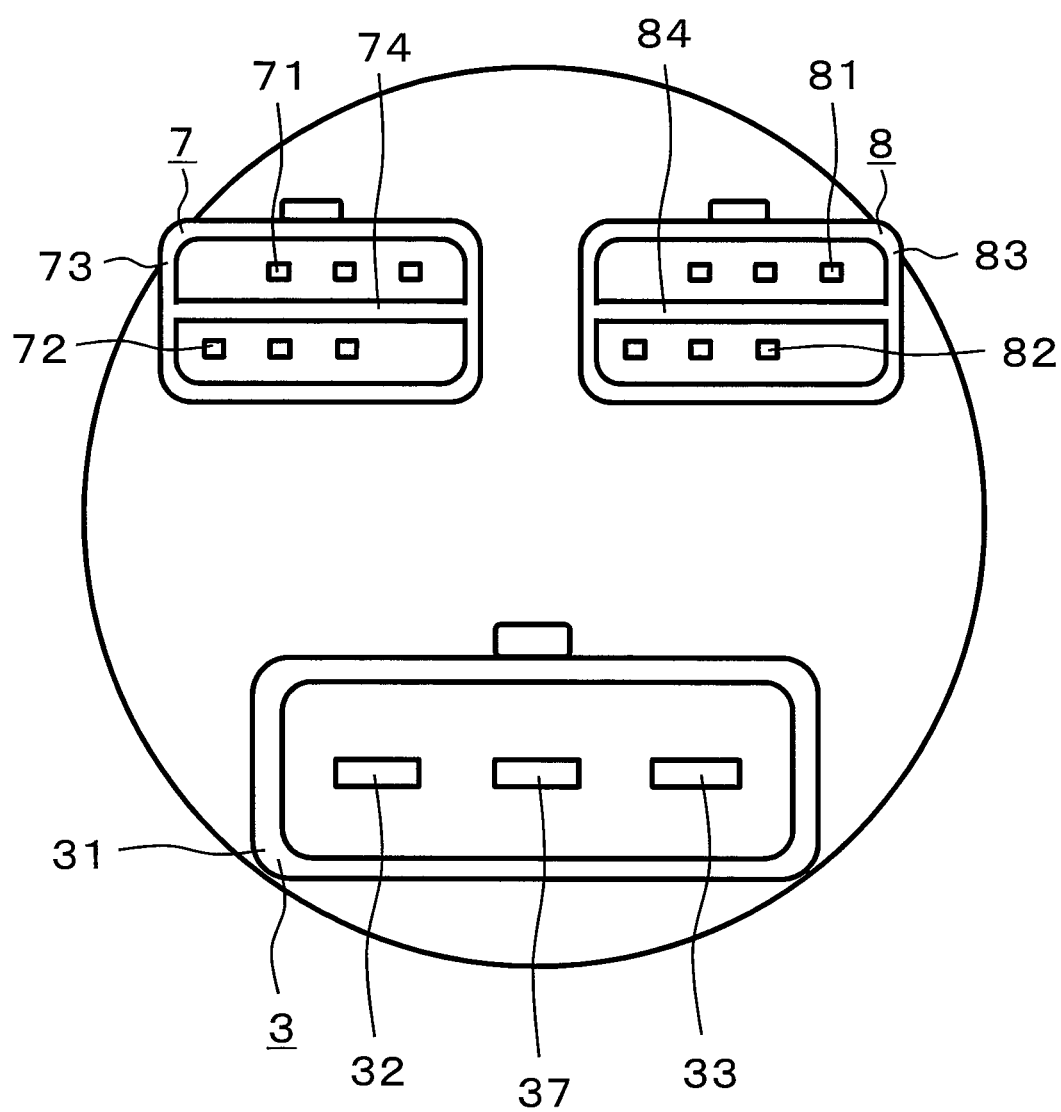
FIG. 4 is a plan view for illustrating the electric drive device of FIG. 3.

FIG. 3 is a side view for illustrating an electric drive device according to a second embodiment of the present invention. FIG. 4 is a plan view for illustrating the electric drive device of FIG. 3. The configurations of the motor 1 and the ECU 2 are the same as those of the first embodiment. The power supply connector 3 includes the power supply connector housing 31, the first power supply terminal 32, the second power supply terminal 33, and a common ground terminal 37. The first power supply terminal 32 and the second power supply terminal 33 are provided in the power supply connector housing 31, and are electrically connected to separate external power sources, respectively. The common ground terminal 37 is provided in the power supply connector housing 31, and is electrically connected to the external ground. Unlike the power supply connector 3 in the first embodiment, the power supply connector 3 in the second embodiment does not include the power supply connector partition wall 36.

Moreover, the electric drive device further includes a first connector 7 and a second connector 8 electrically connected to the ECU 2. The first connector 7 and the second connector 8 are each a connector for both a vehicle signal and a torque sensor signal.

The first connector 7 includes first vehicle signal terminals 71, first torque sensor signal terminals 72, a first connector housing 73, and a first connector partition wall 74. The first vehicle signal terminals 71 are electrically connected to a first vehicle-side device being a first vehicle signal emitting device. The first torque sensor signal terminals 72 are electrically connected to a first torque sensor. In the first connector housing 73, there are provided the first vehicle signal terminals 71 and the first torque sensor signal terminals 72. The first connector partition wall 74 is formed on the first connector housing 73, and is configured to isolate the first vehicle signal terminals 71 and the first torque sensor signal terminals 72 from each other.

The second connector 8 includes second vehicle signal terminals 81, second torque sensor signal terminals 82, a second connector housing 83, and a second connector partition wall 84. The second vehicle signal terminals 81 are electrically connected to a second vehicle-side device being a second vehicle signal emitting device. The second torque sensor signal terminals 82 are electrically connected to a second torque sensor. In the second connector housing 83, there are provided the second vehicle signal terminals 81 and the second torque sensor signal terminals 82. The second connector partition wall 84 is formed on the second connector housing 83, and is configured to isolate the second vehicle signal terminals 81 and the second torque sensor signal terminals 82 from each other.

The first vehicle-side device and the second vehicle-side device are separate vehicle-side devices. The first torque sensor and the second torque sensor are separate torque sensors. Other configurations are the same as those of the first embodiment.

As described above, in the electric drive device according to the second embodiment of the present invention, the power supply connector 3 includes the common ground terminal 37 provided in the power supply connector housing 31 and electrically connected to the external ground. Thus, the number of terminals of the power supply connector 3 can be reduced. As a result, downsizing of the electric drive device can be achieved, and reduction in cost of the electric drive device can be achieved owing to reduction in the number of components.

Further, the electric drive device includes the first connector 7 and the second connector 8 electrically connected to the ECU 2. The first connector 7 includes the first vehicle signal terminals 71 electrically connected to the first vehicle-side device, the first torque sensor signal terminals 72 electrically connected to the first torque sensor, and the first connector housing 73 in which the first vehicle signal terminals 71 and the first torque sensor signal terminals 72 are provided. The second connector 8 includes the second vehicle signal terminals 81 electrically connected to the second vehicle-side device, the second torque sensor signal terminals 82 electrically connected to the second torque sensor, and the second connector housing 83 in which the second vehicle signal terminals 81 and the second torque sensor signal terminals 82 are provided. Therefore, even when a failure occurs in any one of the first connector 7 and the second connector 8, driving of the electric drive device can be performed through use of another of the first connector 7 and the second connector 8 that does not fail. As a result, reliability of the electric drive device can be enhanced.

In the second embodiment, description is made of the configuration in which the power supply connector housing 31 includes the common ground terminal 37 that is provided in the power supply connector housing 31 and electrically connected to the external ground. However, similarly to the first embodiment, there may be adopted a configuration in which the power supply connector housing 31 includes the first ground terminal 34 and the second ground terminal 35.

Further, in the second embodiment, description is made of the configuration in which no power supply connector partition wall is formed between the first power supply terminal 32 and the common ground terminal 37 and between the second power supply terminal 33 and the common ground terminal 37. However, there may be adopted a configuration in which the power supply connector partition wall is formed in at least one of a region between the first power supply terminal 32 and the common ground terminal 37 and a region between the second power supply terminal 33 and the common ground terminal 37.

Further, in the second embodiment, description is made of the configuration in which the electric drive device includes the first connector 7 and the second connector 8 electrically connected to the ECU 2. However, similarly to the first embodiment, there may be adopted a configuration in which the electric drive device includes the power supply connector 3 electrically connected to the ECU 2, and the vehicle signal connector 5 electrically connected to the ECU 2.

Third Embodiment

Figure 5:
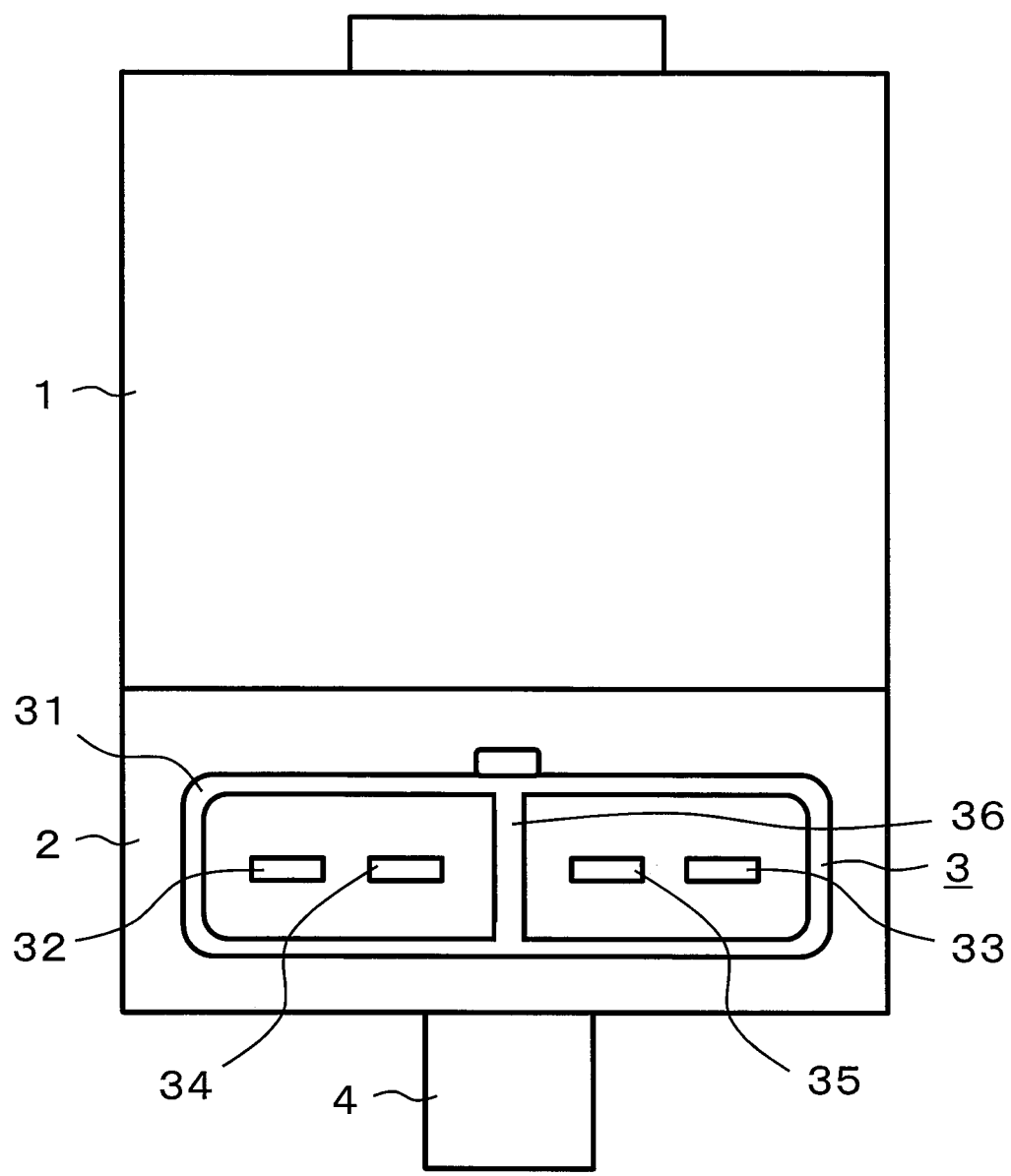
FIG. 5 is a side view for illustrating an electric drive device according to a third embodiment of the present invention.
Figure 6:
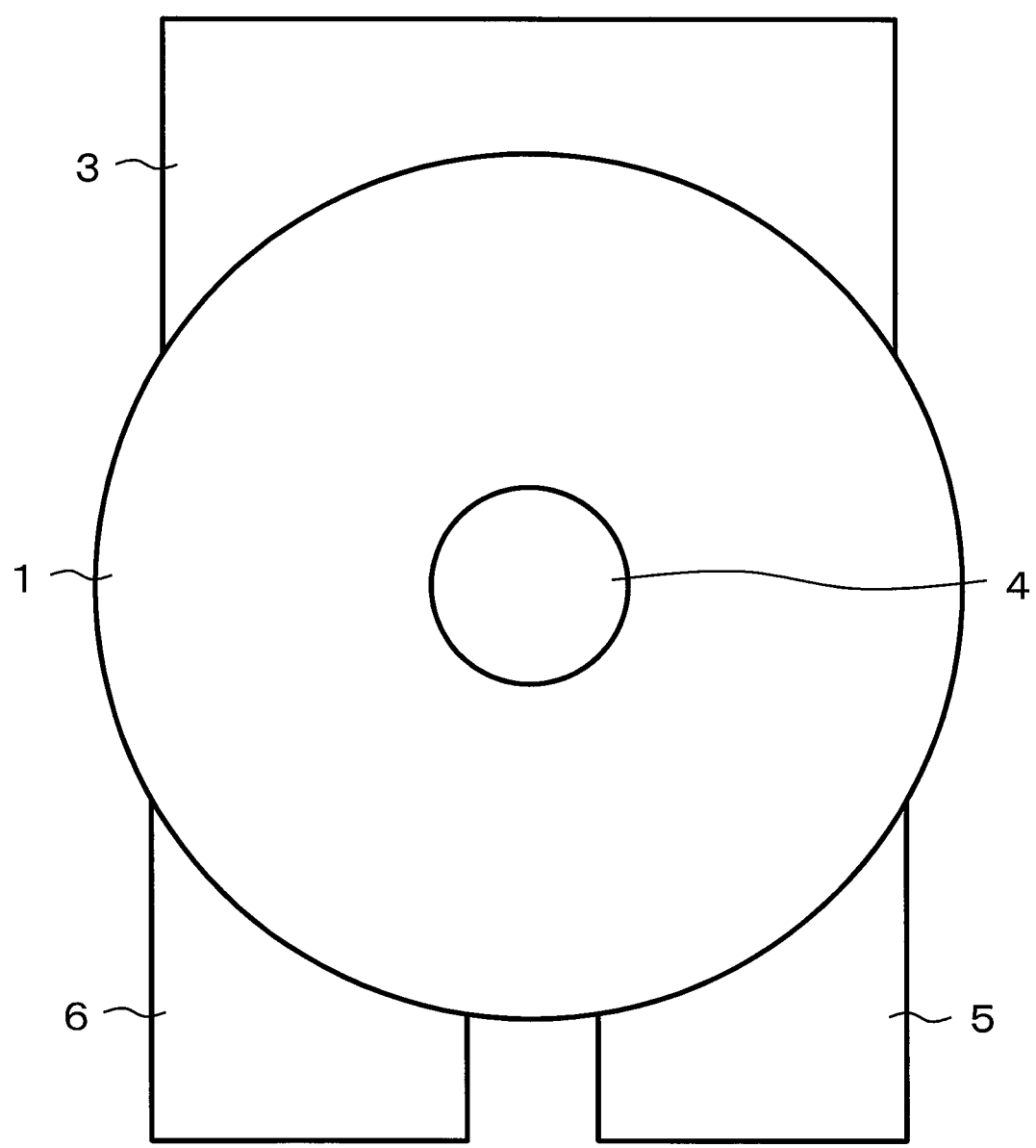
FIG. 6 is a bottom view for illustrating the electric drive device of FIG. 5.
Figure 7:
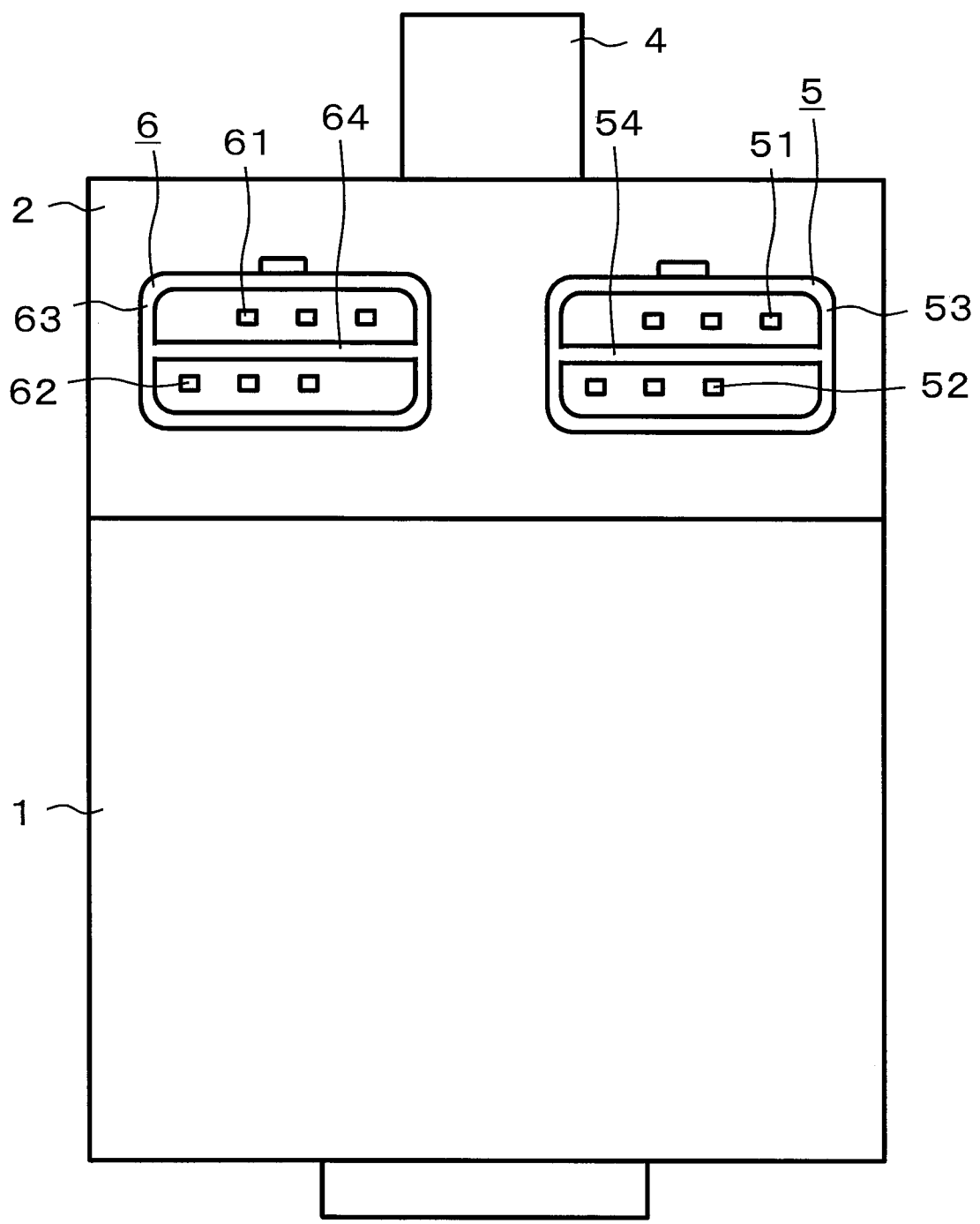
FIG. 7 is a side view for illustrating the electric drive device of FIG. 6.

FIG. 5 is a side view for illustrating an electric drive device according to a third embodiment of the present invention. FIG. 6 is a bottom view for illustrating the electric drive device of FIG. 5. FIG. 7 is a side view for illustrating the electric drive device of FIG. 6. The ECU 2 is arranged between the motor 1 and the boss 4. The power supply connector 3 is arranged on a side surface of the ECU 2. The vehicle signal connector 5 and the torque sensor connector 6 are arranged on a side surface of the ECU 2. Other configurations are the same as those of the first embodiment.

As described above, in the electric drive device according the third embodiment of the present invention, the power supply connector 3, the vehicle signal connector 5, and the torque sensor connector 6 are arranged on the side surfaces of the ECU 2. Therefore, as compared to the first embodiment, a dimension of the electric drive device in the axis line direction of the motor 1 can be reduced.

Fourth Embodiment

Figure 8:
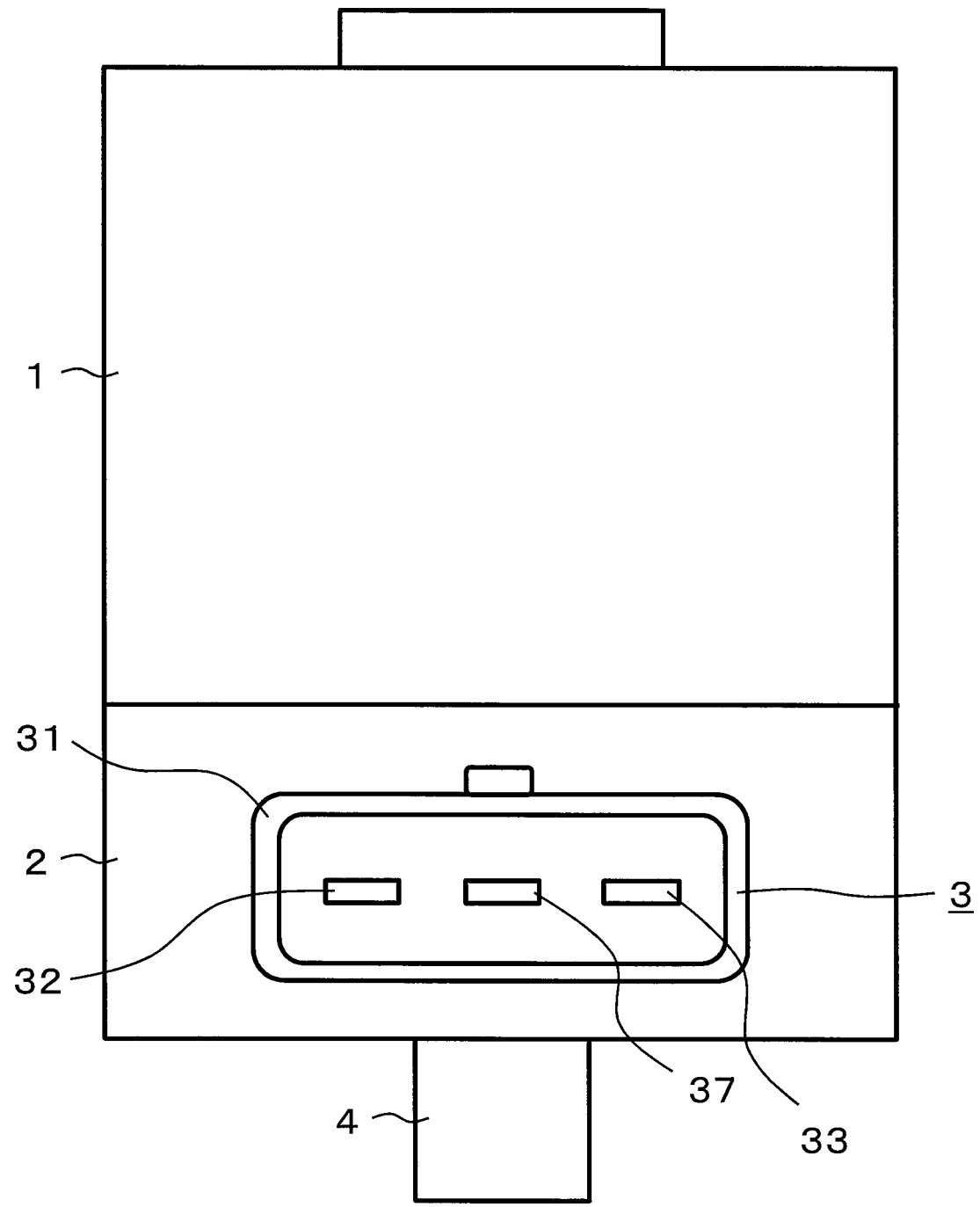
FIG. 8 is a side view for illustrating an electric drive device according to a fourth embodiment of the present invention.
Figure 9:
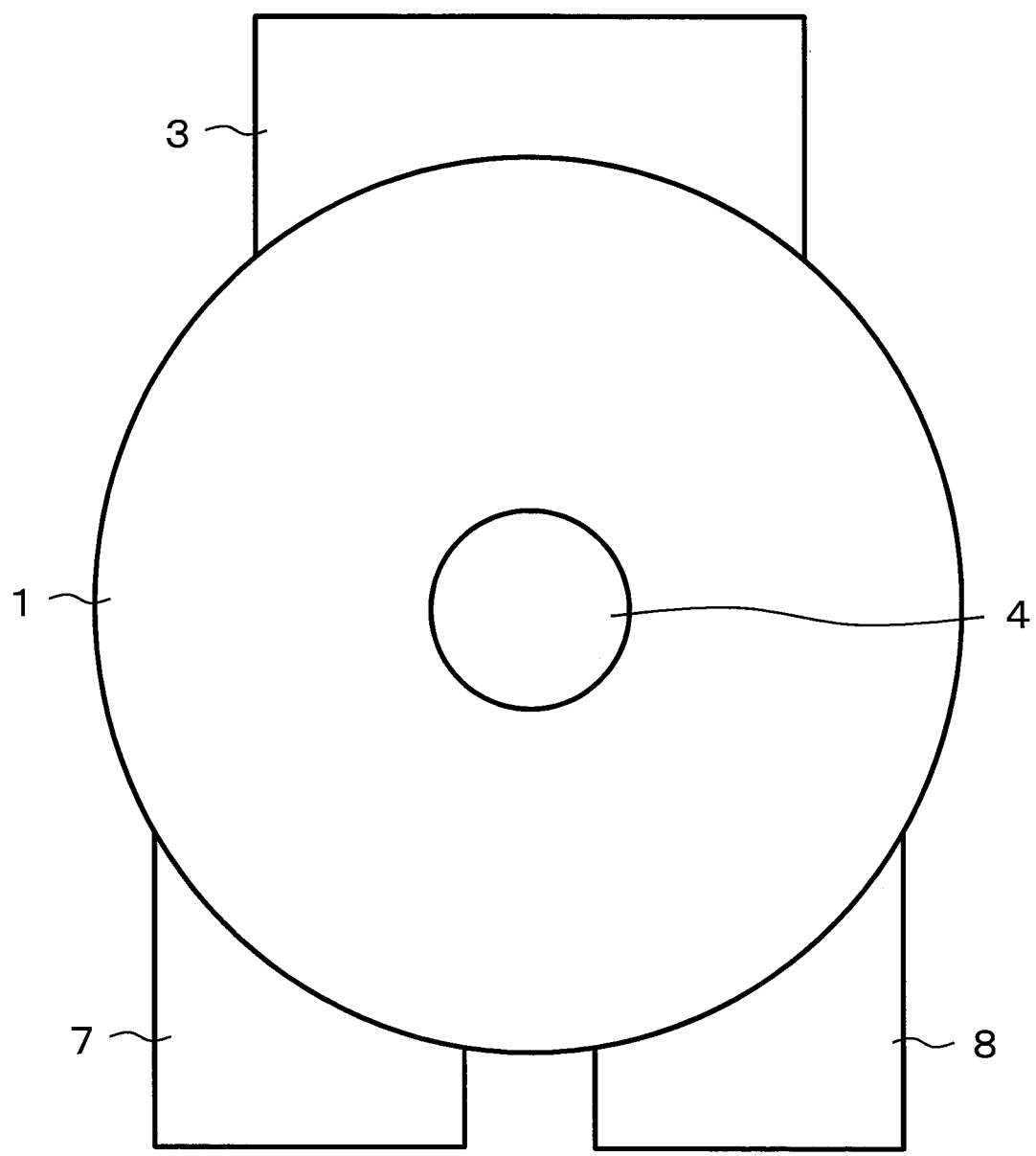
FIG. 9 is a bottom view for illustrating the electric drive device of FIG. 8.
Figure 10:
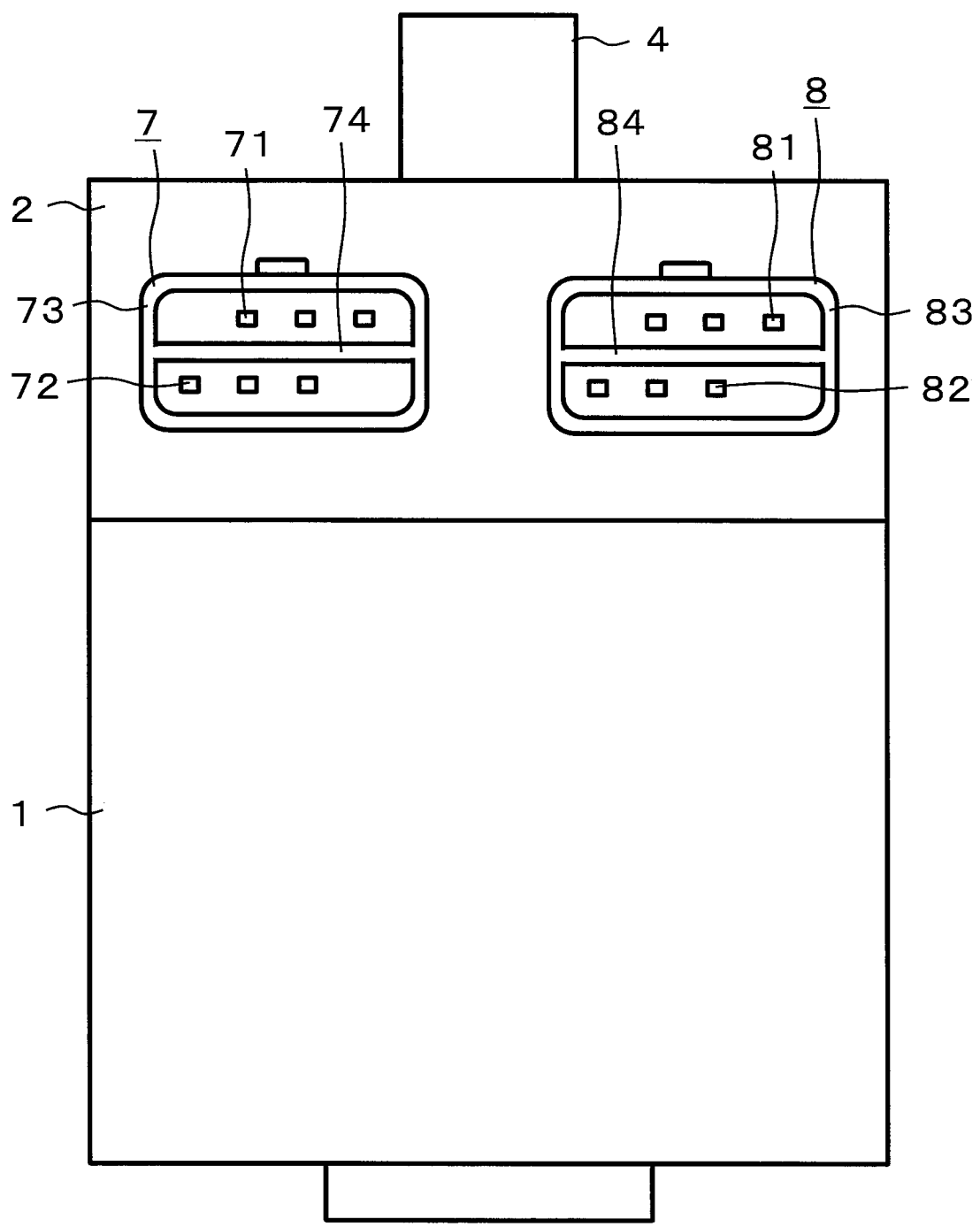
FIG. 10 is a side view for illustrating the electric drive device of FIG. 9.

FIG. 8 is a side view for illustrating an electric drive device according to a fourth embodiment of the present invention. FIG. 9 is a bottom view for illustrating the electric drive device of FIG. 8. FIG. 10 is a side view for illustrating the electric drive device of FIG. 9. The ECU 2 is arranged between the motor 1 and the boss 4. The power supply connector 3 is arranged on a side surface of the ECU 2. The first connector 7 and the second connector 8 are arranged on a side surface of the ECU 2. Other configurations are the same as those of the second embodiment.

As described above, in the electric drive device according to the fourth embodiment of the present invention, the power supply connector 3, the first connector 7, and the second connector 8 are arranged on the side surfaces of the ECU 2. Therefore, as compared to the second embodiment, dimension of the electric drive device in the axis line direction of the motor 1 can be reduced.

The invention claimed is:

1. An electric drive device, comprising:
    a motor;
    a controller configured to control driving of the motor; and
    a power supply connector electrically connected to the controller, and including:
        a power supply connector housing,
        a first power supply terminal and a second power supply terminal, which are provided in the power supply connector housing and electrically connected to separate external power sources, respectively, to achieve a redundant supply of power from outside, and
        a first ground terminal and a second ground terminal which are provided in the power supply connector housing and electrically connected to an external ground,
    wherein the first power terminal, the first ground terminal, the second ground terminal, and the second power supply terminal are aligned in the power supply connector housing in this order, and
    the first ground terminal and the second ground terminal are arranged next to each other.

2. An electric drive device according to claim 1, wherein the power supply connector further includes a power supply connector partition wall formed on the power supply connector housing and configured to isolate the first power supply terminal and the second power supply terminal from each other.

3. An electric drive device according to claim 1, further comprising:
    a vehicle signal connector electrically connected to the controller; and
    a torque sensor connector electrically connected to the controller,
    wherein the vehicle signal connector includes a first vehicle signal terminal and a second vehicle signal terminal electrically connected to separate vehicle signal emitting devices, respectively, and
    wherein the torque sensor connector includes a first torque sensor signal terminal and a second torque sensor signal terminal electrically connected to separate torque sensors, respectively.

4. An electric drive device according to claim 3, wherein the vehicle signal connector further includes a vehicle signal connector housing in which the first vehicle signal terminal and the second vehicle signal terminal are provided, and
    wherein the torque sensor connector further includes a torque sensor connector housing in which the first torque sensor signal terminal and the second torque sensor signal terminal are provided.

5. An electric drive device according to claim 4, wherein the vehicle signal connector further includes a vehicle signal connector partition wall formed on the vehicle signal connector housing and configured to isolate the first vehicle signal terminal and the second vehicle signal terminal from each other, and
wherein the torque sensor connector further includes a torque sensor connector partition wall formed on the torque sensor connector housing and configured to isolate the first torque sensor signal terminal and the second torque sensor signal terminal from each other.

6. An electric drive device according to claim 1, further comprising a first connector and a second connector electrically connected to the controller,
wherein the first connector includes:
a first vehicle signal terminal electrically connected to a first vehicle signal emitting device;
a first torque sensor signal terminal electrically connected to a first torque sensor; and
a first connector housing in which the first vehicle signal terminal and the first torque sensor signal terminal are provided, and
wherein the second connector includes:
a second vehicle signal terminal electrically connected to a second vehicle signal emitting device;
a second torque sensor signal terminal electrically connected to a second torque sensor; and
a second connector housing in which the second vehicle signal terminal and the second torque sensor signal terminal are provided.

* * * * *